Feb. 21, 1967  O. R. SCHAPER  3,305,028
TRACTOR MOUNTING FOR AGRICULTURAL IMPLEMENTS
Filed Sept. 29, 1964  3 Sheets-Sheet 1
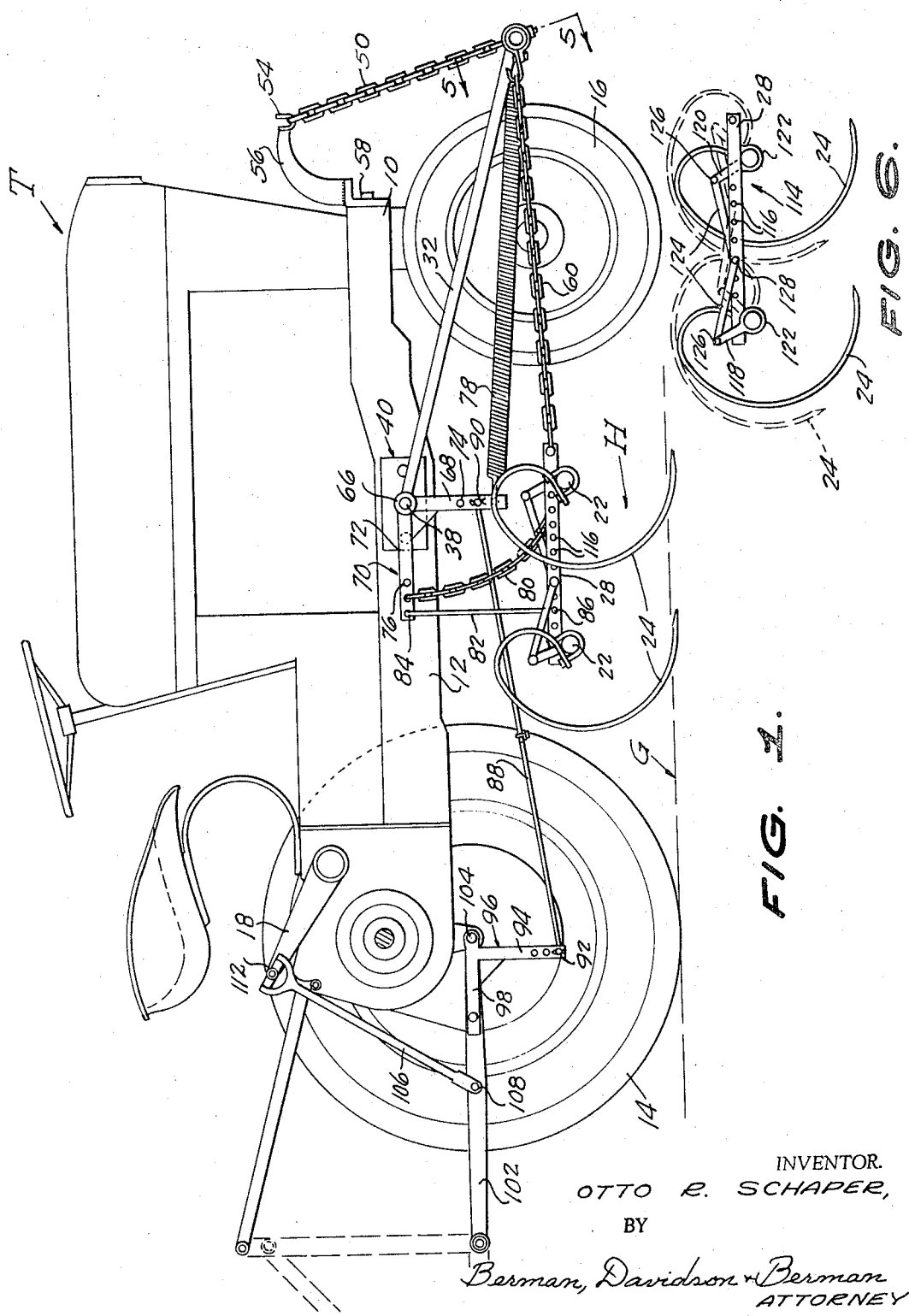
INVENTOR.
OTTO R. SCHAPER,
BY
Berman, Davidson & Berman
ATTORNEYS.

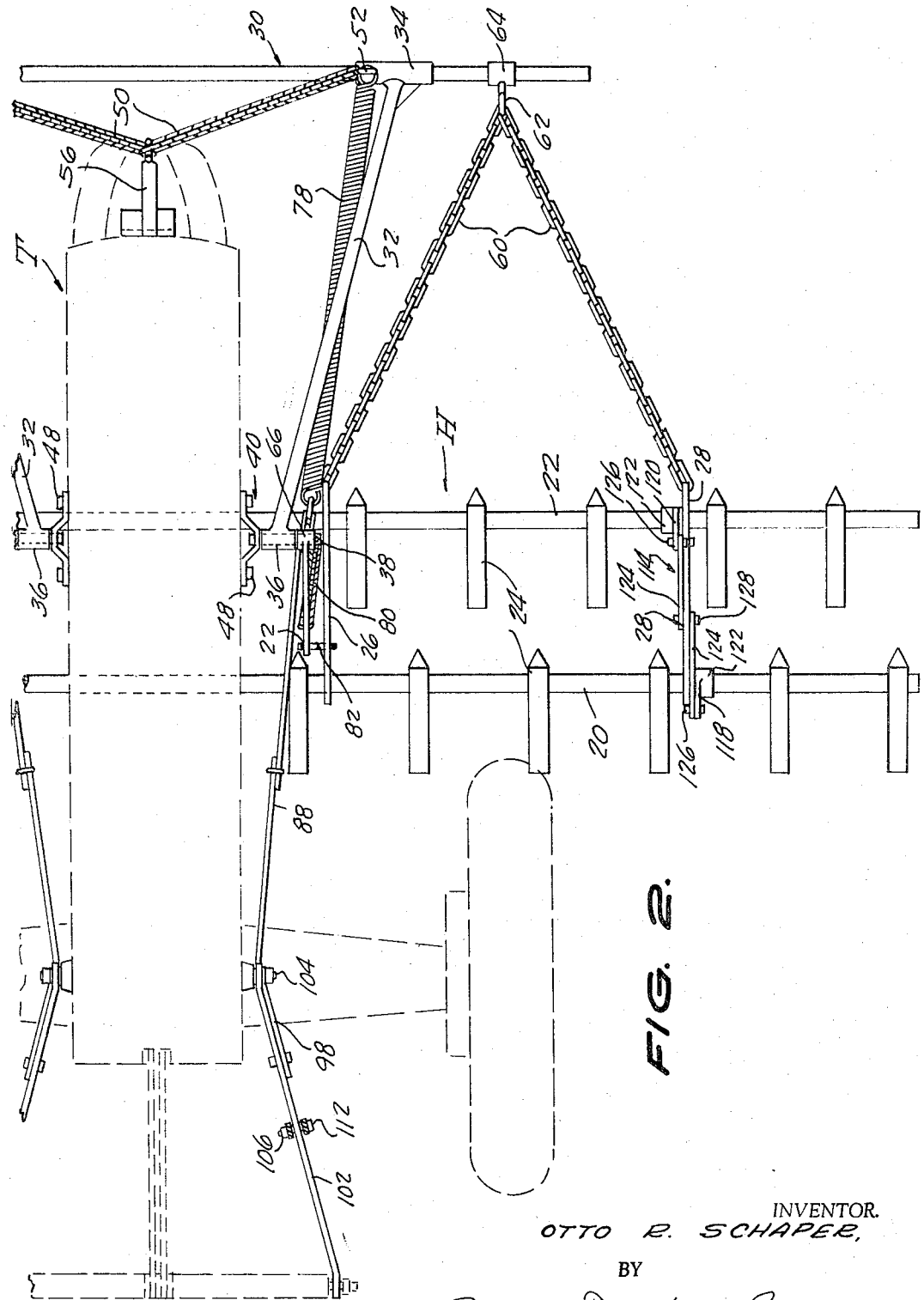

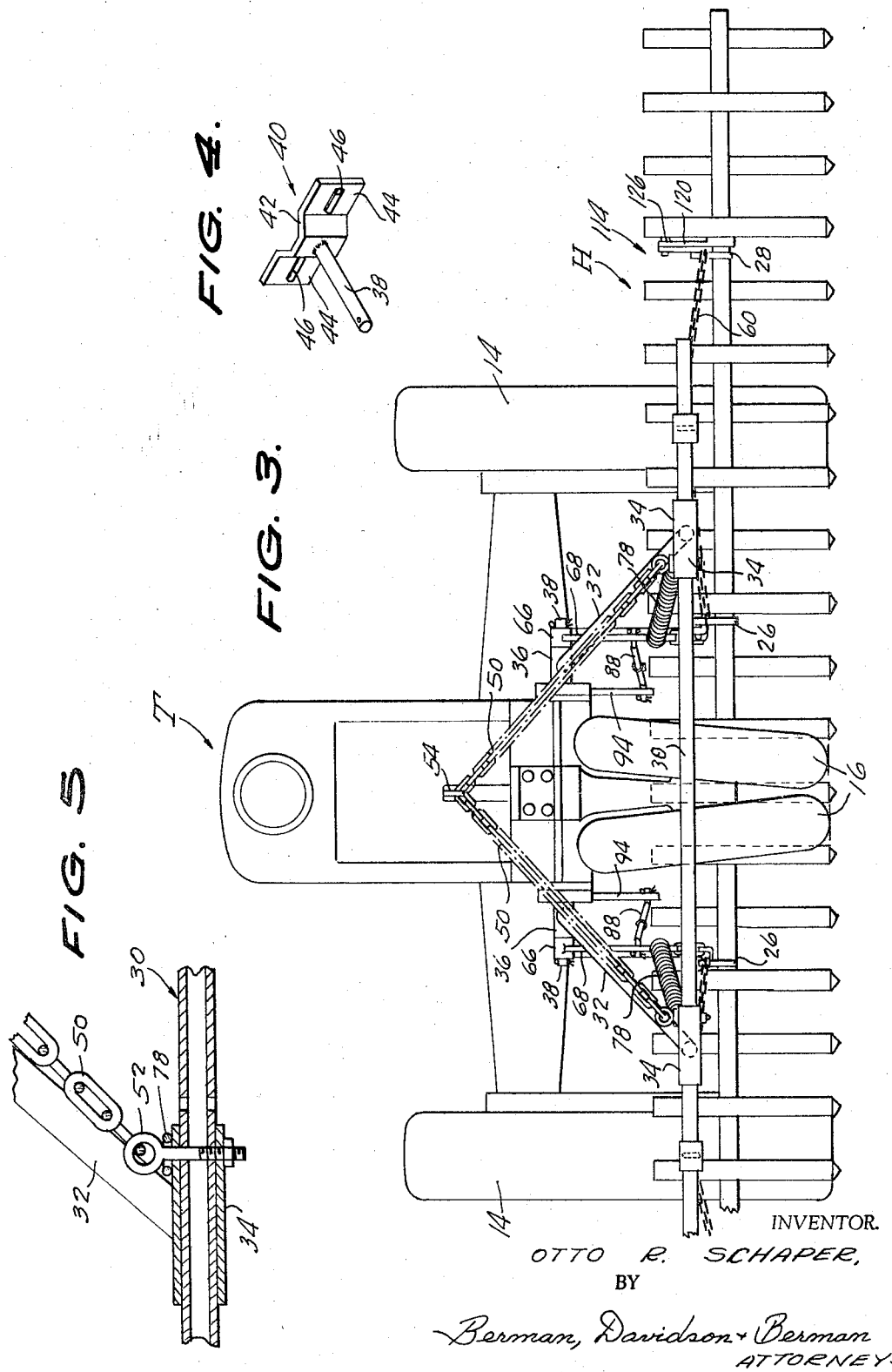

United States Patent Office 3,305,028
Patented Feb. 21, 1967

3,305,028
TRACTOR MOUNTING FOR AGRICULTURAL IMPLEMENTS
Otto R. Schaper, Estherville, Iowa 51334
Filed Sept. 29, 1964, Ser. No. 400,109
8 Claims. (Cl. 172—297)

This invention relates to a mounting assembly for mounting agricultural implements, such as spring-tooth or other harrows on tractors.

The primary object of the invention is the provision of a mounting assembly of the kind indicated, which places the agricultural implement beneath a tractor, between its drive wheels and its forward steering wheels, and thereby does not in any way encumber the rear of the tractor, but, instead, frees the rear end of the tractor for drawing other agricultural implements, such as planters, whereby two related operations can be efficiently performed by one tractor and one operator or driver.

Another object of the invention is the provision of a mounting assembly of the character indicated above, which is simple and uncomplicated in form, is easily applied to a tractor, and which has provisions for over-all adjustments of the implement, associated with the assembly, relative to the ground, and for operating adjustments of the assembly, through operation of the tractor's hydraulic lifting arm.

In the drawings:
FIGURE 1 is a side elevation of a tractor showing a spring-tooth harrow mounted thereon by means of a mounting assembly of the present invention;
FIGURE 2 is a fragmentary top plan view of FIGURE 1;
FIGURE 3 is a fragmentary front elevation of FIGURE 1;
FIGURE 4 is an enlarged perspective view of a tractor carried spindle bracket;
FIGURE 5 is an enlarged fragmentary vertical transverse section taken on the line 5—5 of FIGURE 1; and,
FIGURE 6 is a schematic side elevation of a harrow tooth adjusting assembly, showing different positions of the teeth, in full, and in phantom lines.

Referring in detail to the drawings, a conventional tractor T is shown, which has the frame 10 including side members 12, rear drive wheels 14, and front steering wheels 16, and hydraulic lift arms 18, extending rearwardly from the frame 10.

A two-row harrow H is located beneath the tractor frame 10, between the drive wheels 14 and the steering wheels 16, and comprises two parallel spaced horizontal beams 20 and 23, which extend beyond opposite sides of the tractor. The beams 20 and 22 carry downwardly and forwardly curved spring teeth 24, which are positioned in staggered relationships relative to the beams. At locations close to the sides of the tractor, inner longitudinal horizontal bars 26 extend between and are secured to the beams 20 and 22, as do outer bars 28, which are spaced outwardly from the inner bars 26. It will be understood that, instead of a two-row harrow, as illustrated, a four or six-row harrow can be accommodated.

A transversely elongated horizontal drawbar 30, which is spaced forwardly from the tractor T, and is located on a level below the tractor frame 10, and in front of the steering wheels 16 of the tractor, is supported in this position by forwardly divergent struts 32, located at opposite sides of the tractor. The struts 32 have sleeves 34, on their forward ends, through which related portions of the drawbar 30 extend, and sleeves 36, on their rear ends, which are journaled on the laterally projecting spindles 38 of spindle brackets 40, which are fixed to the outer sides of the side members 12 of the tractor frame, at locations above the forward beam 20 of the harrow H. As shown in FIGURE 4, the spindle brackets 40 comprise elongated plates 42 having end portions 44, formed with horizontal longitudinal slots 46, and laterally outwardly offset middle portions, on which the spindles 38 are fixed. Bolts 48, extended through the slots 46 are threaded into the tractor frame side members 12.

The drawbar 30 is further supported in position, by means of a pair of forwardly and downwardly divergent vertical chains 50, which, at their forward ends, are secured to eye-bolts 52, which, as shown in FIGURE 5, extend through the forward strut sleeves 34, and the drawbar. The rear ends of the chains 50 are securably engaged over a hook 54, on the elevated forward end of an inverted J-shaped bracket 56, which centrally is fixed, as indicated at 58, to the front end of the tractor frame 10. The height of the drawbar 30 is adapted to be adjusted, by changing the links of the chain 50, engaged over the hook 54.

Pairs of forwardly convergent horizontal draft chains 60, located at opposite sides of the tractor, are connected, at their forward ends, to eyes 62, on relatively short sleeves 64, spaced outwardly from the strut sleeves 34, and, at their rear ends, to the forward ends of the inner and outer harrow bars 26 and 28.

Also journaled on the spindles 38 of the spindle brackets 40, outwardly of the rear strut sleeves 36, are journals 66, on the upper ends of the vertical arms 68 of inverted L-shaped bell cranks 70, having rearwardly extending horizontal arms 72. The vertical arms 68 are provided with spaced adjustment holes 74, which are duplicated in the horizontal arms 72, as indicated at 76. Single horizontal, forwardly divergent coil springs 78 are secured, under tension, at their rear ends, in holes 74 of the vertical arms 68 of the bell cranks, and, at their forward ends, to the eye-bolts 52, related to the forward strut sleeves 34.

Relatively slack vertical safety chains 80 are secured, at their upper ends, in holes 76 of the horizontal arms 72 of the bell cranks, and, at their lower ends, to the front harrow beams 22. Vertical links 82 are pivotally secured, at their upper ends, as indicated at 84, in holes 76 of the horizontal bell crank arms, behind the safety chains 80, and, pivotally secured, at their lower ends, as indicated at 86, to the harrow bars 26 and 28, at locations between the harrow beams 20 and 22.

The foregoing arrangement, given proper adjustments of the vertical chains 50, affords the proper over-all adjustment of the harrow H, relative to the ground G.

For producing vertical operating adjustments of the harrow H, relative to the ground G, the vertical arms 68 of the bell cranks 70 are operatively connected, by means of lengthwise adjustable horizontal links 88 which are pivotally connected, at their forward ends, as indicated at 90, in holes 74 of the vertical arms 68. At their rear ends, the horizontal links 88 are pivotally secured, as indicated at 92, to lower portions of the vertical arms 94 of bell cranks 96.

The bell cranks 96 have rearwardly extending horizontal arms 98 on rearwardly extending horizontal levers 102, which are pivoted, at their forward ends, as indicated at 104, to the underside of the tractor frame 10, vertical lift links 106 being pivoted, at their lower ends, as indicated at 108, to intermediate parts of the arms 102, and, at their upper ends, to the hydraulic tractor lift arms 18, as indicated at 112. This arrangement enables drive of the tractor T to elevate the harrow H, relative to the ground, by moving the hydraulic lift arms 18, and to depress the harrow H, by swinging the lift arms 18 downwardly. The horizontal springs 78 act to resist elevation of the harrow H, from its over-all adjusted position, and acts to help return the harrow, from an elevated position, relative to the ground, to its over-all adjusted position.

As shown in detail in FIGURE 6, the angles of the spring teeth 24 are adapted to be changed, relative to the perpendicular by means of adjusting assemblies 114, extending between the harrow beams 20 and 22. The assemblies 114 are spaced outwardly from the sides of the tractor T, and comprise the bars 28, which are formed with longitudinally spaced adjustment holes 116, upstanding parallel levers 118 and 120 fixed on the beams 20 and 22, respectively, as indicated at 122, links 124 pivoted at one end, as indicated at 126, to the upper ends of the levers 118, 120, the links being traversed at their other ends, by a single bolt 128, which is extended through a selected adjustment hole 116 of the bars 28. Placement of the bolt 128 in holes 116 forwardly of a prior placement thereof, produces forward rotation of the beams 20, 22 with consequent elevation of the harrow teeth 24, as indicated in phantom lines in FIGURE 6, and the solid line position thereof can be restored by placing the bolt 128 in rearward adjustment holes 116.

What is claimed is:

1. In combination with a tractor comprising a frame having side members, drive wheels at the rear end of the frame, and steering wheels at the forward end of the frame, an agricultural implement positioned between the drive wheels and the steering wheels and beneath the tractor frame, and means mounting the implement on the tractor frame wherein the said implement is a harrow having spaced transverse horizontal front and rear beams, spring teeth fixed to the beams in staggered relationship, longitudinal bar means extending between and fixed to the beams, said mounting means comprising a horizontal transverse drawbar positioned in front of the tractor steering wheels, flexible and adjustable means connected between the drawbar and the front end of the tractor frame, rigid strut means connected at the forward end thereof to the drawbar and pivoted at the rear end thereof to the tractor frame, at a location over the harrow.

2. In combination with a tractor comprising a frame having side members, drive wheels at the rear end of the frame, and steering wheels at the forward end of the frame, an agricultural implement positioned between the drive wheels and the steering wheels and beneath the tractor frame, and means mounting the implement on the tractor frame wherein the said implement is a harrow having spaced transverse horizontal front and rear beams, spring teeth fixed to the beams in staggered relationship, longitudinal bar means extending between and fixed to the beams, said mounting means comprising a horizontal transverse drawbar positioned in front of the tractor steering wheels, flexible and adjustable means connected between the drawbar and the front end of the tractor frame, rigid strut means connected at the forward end thereof to the drawbar and pivoted at the rear end thereof to the tractor frame, at a location over the harrow, flexible draft means connected at the rear end thereof to said longitudinal bar means and at the forward end thereof to the drawbar.

3. In combination with a tractor comprising a frame having side members, drive wheels at the rear end of the frame, and steering wheels at the forward end of the frame, an agricultural implement positioned between the drive wheels and the steering wheels and beneath the tractor frame, and means mounting the implement on the tractor frame wherein the said implement is a harrow having spaced transverse horizontal front and rear beams, spring teeth fixed to the beams in staggered relationship, longitudinal bar means extending between and fixed to the beams, said mounting means comprising a horizontal transverse drawbar positioned in front of the tractor steering wheels, flexible and adjustable means connected between the drawbar and the front end of the tractor frame, rigid strut means connected at the forward end thereof to the drawbar and pivoted at the rear end thereof to the tractor frame, at a location over the harrow, flexible draft means connected at the rear end thereof to said longitudinal bar means and at the forward end thereof to the drawbar, forward bell crank means pivoted on the pivotal axis of the strut means, said bell crank means having pendant vertical arm means and rearwardly extending horizontal arm means, draft spring means connected at the rear end thereof to said vertical arm means and at the forward end thereof to the drawbar, vertical link means pivoted at the upper end thereof to said horizontal arm means and at the lower end thereof to said longitudinal bar means.

4. In combination with a tractor comprising a frame having side members, drive wheels at the rear end of the frame, and steering wheels at the forward end of the frame, an agricultural implement positioned between the drive wheels and the steering wheels and beneath the tractor frame, and means mounting the implement on the tractor frame wherein the said implement is a harrow having spaced transverse horizontal front and rear beams, spring teeth fixed to the beams in staggered relationship, longitudinal bar means extending between and fixed to the beams, said mounting means comprising a horizontal transverse drawbar positioned in front of the tractor steering wheels, flexible and adjustable means connected between the drawbar and the front end of the tractor frame, rigid strut means connected at the forward end thereof to the drawbar and pivoted at the rear end thereof to the tractor frame, at a location over the harrow, flexible draft means connected at the rear end thereof to said longitudinal bar means and at the forward end thereof to the drawbar, forward bell crank means pivoted on the pivotal axis of the strut means, said bell crank means having pendant vertical arm means and rearwardly extending horizontal arm means, draft spring means connected at the rear end thereof to said vertical arm means and at the forward end thereof to the drawbar, vertical link means pivoted at the upper end thereof to said horizontal arm means and at the lower end thereof to said longitudinal bar means, horizontal link means pivoted at the forward end thereof to said vertical arm means, second bell crank means pivoted on the tractor frame at the rear end of the frame, said second bell crank means having pendant vertical arm means and rearwardly extending horizontal arm means, the horizontal link means being pivoted at the rear end thereof to said second vertical arm means, said tractor having hydraulic lift arm means, and means operatively connecting the second horizontal arm means to said lift arm means.

5. In combination with a tractor comprising a frame having side members, drive wheels at the rear end of the frame, and steering wheels at the forward end of the frame, an agricultural implement positioned between the drive wheels and the steering wheels and beneath the tractor frame, and means mounting the implement on the tractor frame wherein the said implement is a harrow having spaced transverse horizontal front and rear beams, spring teeth fixed to the beams in staggered relationship, longitudinal bar means extending between and fixed to the beams, said mounting means comprising a horizontal transverse drawbar positioned in front of the tractor steering wheels, flexible and adjustable means connected between the drawbar and the front end of the tractor frame, rigid strut means connected at the forward end thereof to the drawbar and pivoted at the rear end thereof to the tractor frame, at a location over the harrow, said flexible and adjustable means comprising a pair of downwardly and forwardly divergent chains connected at the rear ends to the front end of the tractor frame and at their forward ends to points spaced along the drawbar.

6. In combination with a tractor comprising a frame having side members, drive wheels at the rear end of the frame, and steering wheels at the forward end of the frame, an agricultural implement positioned between the drive wheels and the steering wheels and beneath the tractor frame, and means mounting the implement on the tractor frame wherein the said implement is a harrow having spaced transverse horizontal front and rear beams, spring teeth fixed to the beams in staggered relationship, longitudinal bar means extending between and fixed to the beams, said mounting means comprising a horizontal transverse drawbar positioned in front of the tractor steering wheels, flexbile and adjustable means connected between the drawbar and the front end of the tractor frame, rigid strut means connected at the forward end thereof to the drawbar and pivoted at the rear end thereof to the tractor frame, at a location over the harrow flexible draft means connected at the rear end thereof to said longitudinal bar means and at the forward end thereof to the drawbar, said flexible draft means comprising forwardly converging chains connected together at their forward ends to the drawbar and connected at their rear ends to points spaced along the front harrow beam.

7. In combination with a tractor comprising a frame having side members, drive wheels at the rear end of the frame, and steering wheels at the forward end of the frame, an agricultural implement positioned between the drive wheels and the steering wheels and beneath the tractor frame, and means mounting the implement on the tractor frame wherein the said implement is a harrow having spaced transverse horizontal front and rear beams, spring teeth fixed to the beams in staggered relationship, longitudinal bar means extending between and fixed to the beams, said mounting means comprising a horizontal transverse drawbar positioned in front of the tractor steering wheels, flexible and adjustable means connected between the drawbar and the front end of the tractor frame, rigid strut means connected at the forward end thereof to the drawbar and pivoted at the rear end thereof to the tractor frame, at a location over the harrow, flexible draft means connected at the rear end thereof to said longitudinal bar means and at the forward end thereof to the drawbar, said flexible draft means comprising forwardly converging chains connected together at their forward ends to the drawbar and connected at their rear ends to points spaced along the front harrow beam, an adjusting assembly extending between the harrow beams and connected to longitudinal bar means for rotating the beams in opposite directions for elevating and depressing the harrow teeth relative to the ground.

8. In combination with a tractor comprising a frame having side members, drive wheels at the rear end of the frame, and steering wheels at the forward end of the frame, an agricultural implement positioned between the drive wheels and the steering wheels and beneath the tractor frame, and means mounting the implement on the tractor frame wherein the said implement is a harrow having spaced transverse horizontal front and rear beams, spring teeth fixed to the beams in staggered relationship, longitudinal bar means extending between and fixed to the beams, said mounting means comprising a horizontal transverse drawbar positioned in front of the tractor steering wheels, flexible and adjustable means connected between the drawbar and the front end of the tractor frame, rigid strut means connected at the forward end thereof to the drawbar and pivoted at the rear end thereof to the tractor frame, at a location over the harrow, flexible draft means connected at the rear end thereof to said longitudinal bar means and at the forward end thereof to the drawbar, said flexible draft means comprising forwardly converging chains connected together at their forward ends to the drawbar and connected at the rear ends to points spaced along the front harrow beam, an adjusting assembly extending between the harrow beams and connected to longitudinal bar means for rotating the beam in opposite directions for elevating and depressing the harrow teeth relative to the ground, said adjusting assembly comprising upstanding parallel levers fixed to the beams alongside of the longitudinal bar means, longitudinal links pivoted at one end thereof to the upper ends of the levers, said longitudinal bar means being formed with longitudinally spaced adjustment holes, the other ends of the links being traversed by a removable bolt, said bolt being engaged in a selected one of the adjustment holes.

References Cited by the Examiner

UNITED STATES PATENTS

| | | | |
|---|---|---|---|
| 301,242 | 7/1884 | Kelly | 172—637 |
| 2,337,110 | 12/1943 | Jones et al. | 172—300 X |
| 2,748,681 | 6/1956 | Stodard | 172—300 |

ABRAHAM G. STONE, *Primary Examiner.*

J. R. OAKS, *Assistant Examiner.*